United States Patent [19]

Rochefort

[11] Patent Number: 4,854,526
[45] Date of Patent: Aug. 8, 1989

[54] SPACECRAFT DESIGN ENABLING THE COMPACT NESTING OF MULTIPLE SPACECRAFT IN THE LAUNCH VEHICLE

[75] Inventor: Mark G. Rochefort, Redondo Beach, Calif.

[73] Assignee: Hughes Aircraft Company, Los Angeles, Calif.

[21] Appl. No.: 83,492

[22] Filed: Aug. 10, 1987

[51] Int. Cl.$^4$ ............................ B64G 1/10; B64G 1/44
[52] U.S. Cl. .................................. 244/158 R; 244/173
[58] Field of Search ............... 244/158 R, 159, 160, 244/161, 162, 167, 173, 158.1; 114/258, 259, 260, 261

[56] References Cited

U.S. PATENT DOCUMENTS

| | | | |
|---|---|---|---|
| 3,241,142 | 3/1966 | Raabe | 244/158 R |
| 3,405,887 | 10/1968 | Mixson | 244/160 |
| 3,508,723 | 4/1970 | Warren et al. | 244/161 |
| 3,608,848 | 9/1971 | Cantor et al. | 244/161 |
| 3,635,425 | 1/1972 | Swet | 244/167 |
| 3,735,942 | 5/1973 | Palz | 244/173 |
| 3,737,117 | 6/1973 | Belew | 244/161 |
| 4,009,851 | 3/1977 | Cable | 244/158 |
| 4,044,974 | 8/1977 | Lingley et al. | 244/118.1 |

FOREIGN PATENT DOCUMENTS 2753188  6/1978  Fed. Rep. of Germany ... 244/158 R

OTHER PUBLICATIONS

A. McGrath and G. Peters, "Use of Pallet-Type Structures in Shuttle-Attached and Free-Flying modes", Acta Astronautica, vol. 7, No. 11 (Nov. 1980), pp. 1239–1258.

Primary Examiner—Galen Barefoot
Attorney, Agent, or Firm—S. M. Mitchell; M. J. Meltzer; A. W. Karambelas

[57] ABSTRACT

A spacecraft (100) such as a satellite, is shaped roughly in the form of a cup with a hollow inner cavity (106) such that a plurality of such spacecraft may be stowed for launch in a nested stack (204), thereby enabling a greater number of satellites to be launched simultaneously with a single launch vehicle (201). The cup-shaped configuration results from the satellite having a base member (105) with panels or side walls (101a, 101b, 101c) extending from portions of the perimeter of the base member at a non-zero angle thereto.

17 Claims, 3 Drawing Sheets

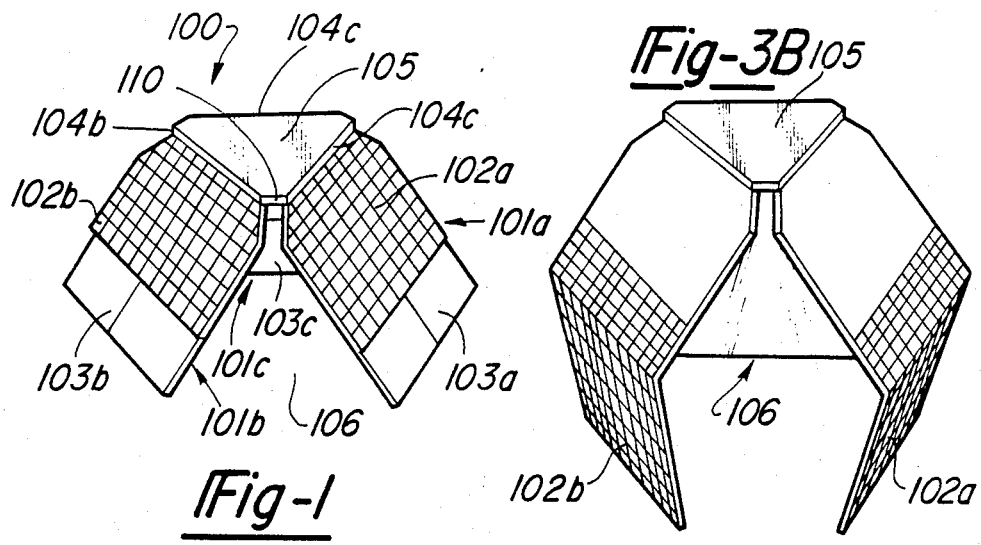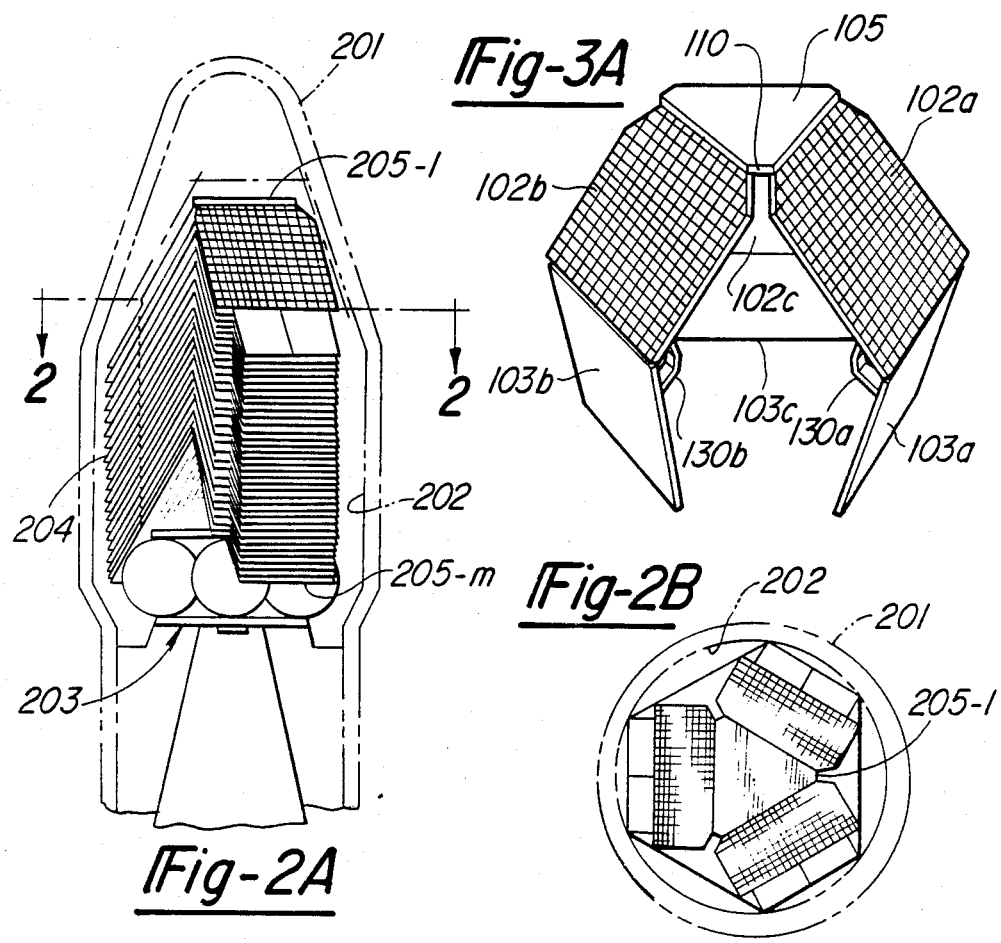

SPACECRAFT DESIGN ENABLING THE COMPACT NESTING OF MULTIPLE SPACECRAFT IN THE LAUNCH VEHICLE

BACKGROUND OF THE INVENTION

This invention relates generally to the physical design of spacecraft. More specifically, the invention concerns design configurations for groups of satellites intended to be simultaneously launched in a single vehicle.

Multiple satellite systems are typically being considered and designed for communication systems and other space applications. With the introduction of multiple satellite systems, a need has arisen for the capability of efficiently and compactly stowing the multiple satellites required for a given mission in a single launch vehicle. It would be economically advantageous to avoid the redesign of currently available launch vehicle stowage compartments and to devise a configuration of satellite or other spacecraft body suitable for enabling the stowage of a large number of identically shaped spacecraft in such launch vehicle stowage compartment.

SUMMARY OF THE INVENTION

It is therefore an object of the invention to fill the need for a spacecraft, e.g., satellite, configuration adapted for use in a multiple satellite system wherein multiple satellites are to be compactly and efficiently stowed for launch in a single launch vehicle.

Accordingly, the invention comprises a spacecraft body configured in a substantially cup-shaped fashion. In a preferred form, for example, a satellite is formed with a base member for housing the spacecraft's electronics and power supply payload, with panels, or side walls, extending from portions of the perimeter of the base member at a non-zero angle to a plane containing the base member perimeter. In a preferred form, the side walls carry arrays of photovoltaic devices, such as solar cells, along with antennas. While the preferred approach is to mount fixed solar cell arrays to each side wall with hingedly deployable antenna panels, the invention contemplates the reverse arrangement as well, wherein the solar cell arrays are deployable with fixed antenna panels mounted to each side wall.

It is a feature of this invention that spacecraft configured in accordance with the principles of this invention may be compactly stacked in a nested fashion for stowage in standard size launch vehicle stowage compartments.

It is a further feature of this invention that the angle between the side walls of the "cup" can be varied for particular design requirements such as sun angle on solar cells, or overall launch vehicle stowage compartment diameter limitations.

Yet another feature of the invention is that the internal cavity of the last spacecraft in a nested stack provides additional space which can be used to hold extra gear, such as additional engines or propulsion fuel tanks for use in transporting the spacecraft to desired locations in outer space.

BRIEF DESCRIPTION OF THE DRAWING

These and other objects and features of the invention will become apparent from a reading of a detailed description of a preferred embodiment taken in conjunction with the drawing, in which:

FIG. 1 is a perspective view of a satellite configured in accordance with the principles of the invention in the stowed or non-deployed state;

FIG. 2A is a cross-sectional view of a launch vehicle storage area containing a nested stack of satellites, each configured as in FIG. 1;

FIG. 2B is a view taken along Section 2—2 of FIG. 2A;

FIG. 3A is a perspective view of the satellite of FIG. 1 with its antenna panels in the deployed state;

FIG. 3B is a perspective view of an alternative satellite of FIG. 1 wherein the antenna panels are fixed and the solar cell arrays are deployable;

DETAILED DESCRIPTION

Figure 4A:
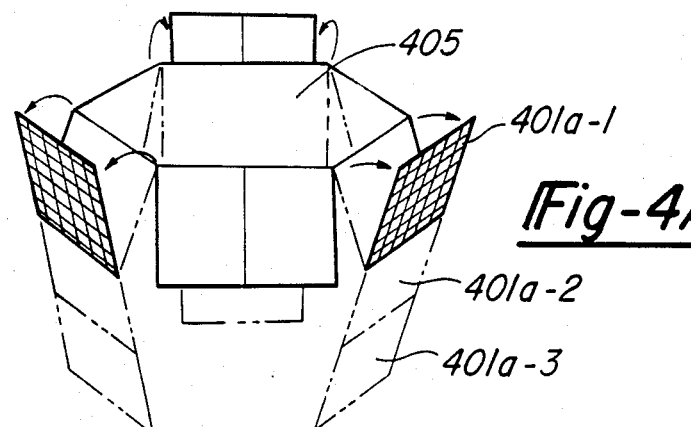
FIGS. 4A–4D set forth variations on how solar cell arrays may be optionally mounted and deployed on the spacecraft of the invention.

FIG. 1 depicts a substantially cup-shaped satellite 100, the cup being formed by the junction of a polygonal (in this case triangular) base member 105 having side walls or panels 101a, 101b, and 101c coupled to its perimeter along the side surfaces 104a, 104b, and 104c of its polygon-shaped base and extending from the base member at a non-zero angle. As a result of this configuration, an inner cavity 106 opening away from base member 105 is roughly defined by base member 105 and surrounding wall members 101a, 101b, and 101c. Each corner of the polygonal base member is truncated in a flatted portion 110 to provide cooling air access to the electronics payload carried by base member 105 while the spacecraft is in a nested stack on the ground in the launch vehicle. The corner truncations also prevent mechanical interference between adjacent side wall members.

In its preferred form, base member 105 is substantially planar and serves as a housing for the electronic circuitry and reserved power source (e.g., batteries) of the satellite. The substantially planar side walls 101a, 101b, and 101c extending from the sides of the base member's polygon are, in the preferred form, essentially serving as mounting plates for substantially flat arrays of photovoltaic devices such as solar cells 102a, 102b, and 102c (not shown), and also as supports for substantially flat antenna planels 103a, 103b, and 103c. The angle between side walls 101 and a plane containing the periphery of polygonal base member 105 may be selected to optimize the orientation of the flat solar panels with respect to the sun. Additionally, this angle may be partially determined by constraints imposed by the stowage facilities of the launch vehicle carrying the satellite of FIG. 1.

Referring now to FIGS. 2A and 2B, it will be seen that satellites configured as in FIG. 1 readily lend themselves to a nested stack of similarly configured spacecraft wherein the inner cavity 106 of a satellite may easily and compactly receive a large portion of the outer surface of a succeeding satellite in a nested stack.

A typical launch vehicle has a fairing portion 201 surrounding an inner stowage cavity 200 which contains a nested stack 204 of satellites, each configured as shown in FIG. 1. Starting with the first satellite in the stack 205-1, it is seen that each succeeding satellite is nested within the cavity defined by the base member and side walls of a preceding satellite and the stack continues in this manner until the last satellite 205-M. The cavity of the last satellite 205-M may be utilized as shown to provide additional housing space for the storage tanks or engines of a launch vehicle propulsion system 203.

FIGS. 3A and 3B depict alternative deployed configurations of the satellite of FIG. 1. FIG. 3A shows a deployable antenna panel arrangement, while FIG. 3B sets forth a deployable solar cell array configuration.

FIG. 3A shows the satellite of FIG. 1 with its antenna panels 103a, 103b, and 103c deployed via hinges, such as at 130b, at a preselected angle to the fixed side wall carrying solar cell panels 102a, 102b, and 102c. The hinges are simple spring mechanisms. The spacecraft panels to be deployed are either (a) allowed to push continuously against another spacecraft below the spacecraft of interest in the nested stack until, as the spacecraft separate from each other in space, the panels deploy under spring force to the desired position, or (b) locked in place until the spacecraft are separated and then released by special command. Deployable antenna panels are preferred over the deployable solar cell array concept (discussed in connection with FIG. 3B, below), in that (a) the solar panel dimensions may be increased without inducing self-interference; (b) the antenna panel inclination may be any angle in the available deployment range and not fixed by the stowed spacecraft side wall angle; and (c) the antenna panel does not have to support a solar panel deployed over the edge of the side wall, as with the alternative approach set forth in FIG. 3B.

FIG. 3B depicts the satellite of FIG. 1 with its solar panels 102a, 102b, and 102c in a deployed state. As seen from FIG. 3B, each solar panel 102 had its edge which was aligned with triangular base member 105 disconnected (by conventional means such as pyrotechnic fasteners, not shown) such that the panel swings out and down over the outer edge of the solar panel's respective side wall. In a typical earth orbit, such a satellite would have its internal cavity 106 facing away from the earth, thereby aligning the antennas mounted on panels 103 (103c being shown in FIG. 3A) at an angle determined by the angle the side walls make with the base member 105. Note that the spacecraft of FIG. 3A, on the other hand, would be oriented with its internal cavity facing earth.

While the spacecraft of FIGS. 1 and 3A or 3B is depicted with a triangular base plate and three side walls depending therefrom, it is to be understood that the invention contemplates the use of many alternative spacecraft body base member forms, e.g., any of the familiar polygons such as a hexagon. The specific form does not matter so long as the spacecraft can be stacked in nested fashion, similar to a stack of cups. FIGS. 4A–4D set forth several alternative arrangements showing various base plate shapes, mounting arrangements for solar cell panels and their deployment.

FIG. 4A shows an alternative form for use where more power is nneded from the solar cell arrays. Under such a circumstance, the additional power may be obtained by adding as many panels to each side wall mounting as may be required. In FIG. 4A, two additional panels are shown in the phantom deployed state. Base member 405 has three panel members connected about its periphery. Solar panels 401a-1, 401a-2, and 401a-3 are shown in the deployed state from one side wall. It will be noted that in addition to supplying extra panels at each side wall, the solar panel at each side wall may be flipped out at an angle optimizing the panel's orientation to a solar source. It will also be apparent that in the stowed condition the hinged solar panels are folded upon one another at each side wall for stowage in the launch vehicle.

Figure 4B:
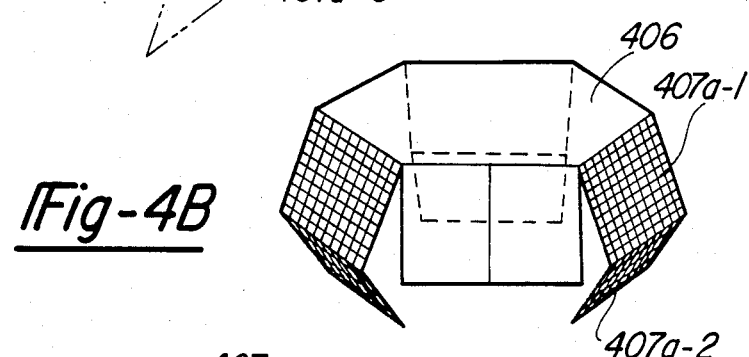

FIG. 4B shows a variation wherein some solar cells are fixed and do not move in the deployed state while some are deployed in an unhinged fashion to extend downward from the base plate 406. Hence, solar array 407a-1 would remain fixed to its side wall mounting while a hingedly coupled array 407a-2 would deploy in a downward direction to hang as shown in FIG. 4B.

Figure 4C:
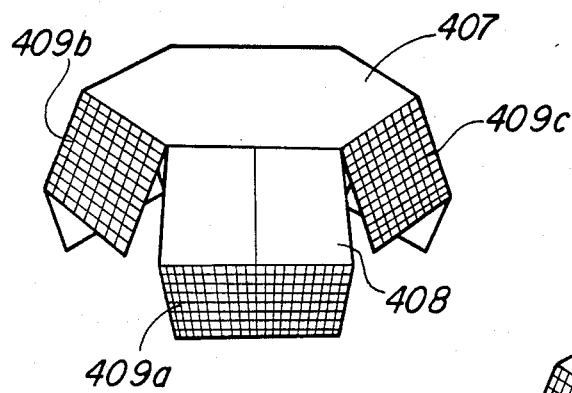

FIG. 4C shows yet another variation wherein non-deployed solar cell arrays 409b and 409c remain fixed to their respective side walls while deployable solar cell array 409a is hinged to a bottom of its side panel such that when deployed it leaves exposed an antenna panel mounting portion of side wall 408 which is coupled to base plate 407.

Figure 4D:
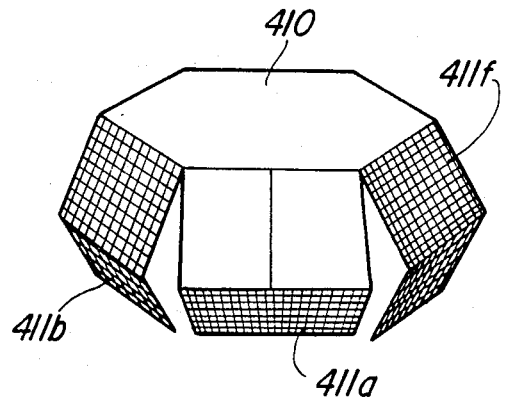

In FIG. 4D, a hexagonally shaped base member 410 provides a coupling perimeter for six side walls, each having its own solar cell array panel 411a-f respectively mounted thereon. With this approach, one face of the "cup" of the satellite is always substantially optimally oriented with respect to the solar source.

It will be appreciated that, depending upon the type of mission, the spacecraft's side walls could carry or comprise a variety of equipment in addition to, or in place of, the antenna panels or solar cell arrays depicted in FIG. 1 through FIG. 4D. For example, certain missions might call for the side walls to carry thin sensors or other scientific instruments or electronic equipment.

Figure 5:
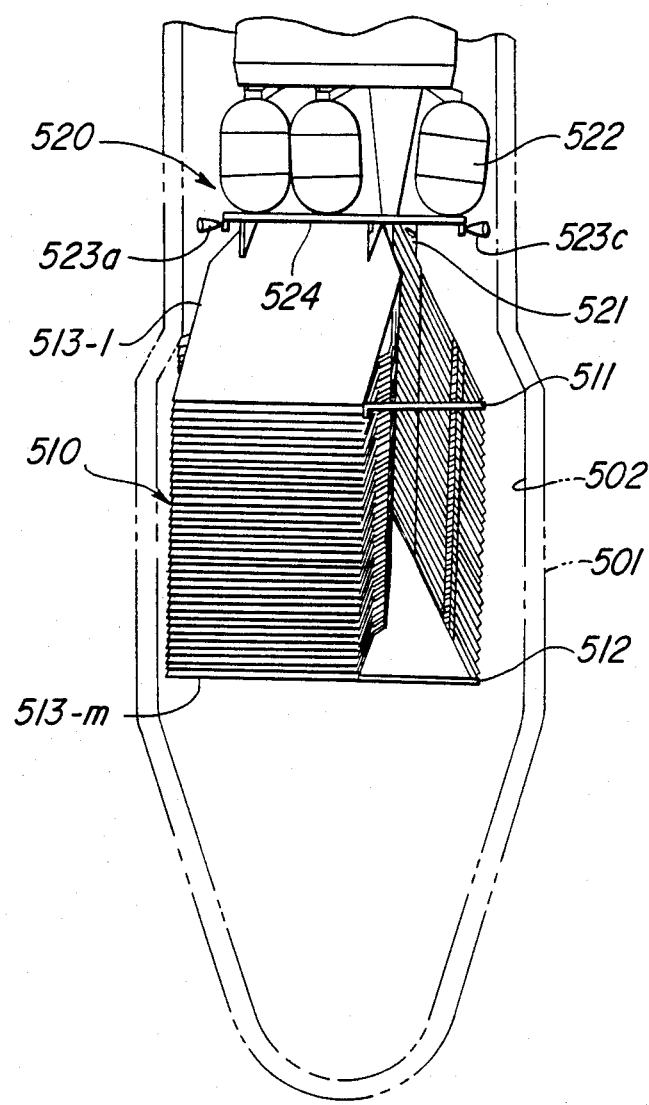
FIG. 5 is a cross-sectional view of a launch vehicle stowage area containing a nested stack of satellites along with apparatus for dispensing one or more satellites from the launch vehicle housing.

The nested stack of satellites configured in accordance with the invention may be dispensed or deployed from the launch vehicle body either one-by-one or in groups of more than one. FIG. 5 depicts a stack of nested satellites with the leading satellite shown coupled to suitable dispensing means. Launch vehicle body 501 has a storage cavity 502 for receiving a nested stack of satellites 510 containing a first satellite 513-1 at the dispenser end of the nested stack and a final satellite 513-n at an end of the stack remote from the dispensing apparatus. The stack of satellites 510 is secured for launch and transport by launch vehicle 501 with a first clamp frame 511 and a second clamp frame 512. The stack 510 is secured in spring loaded fashion to tie down plate 524 by spring loaded removable fasteners such as pyrotechnic bolts at each corner of the polygon base member. The tie down assembly 521 and the spring-loaded pyrotechnic bolt are not shown in detail, as such releasable fastening mechanisms are known in the art and do not form a material part of the invention. Mounted to the tie down plate 524 are a plurality of thrusters as needed, two being shown in FIG. 5 and designated 523a, and 523c (with a third thruster not shown in this view). Adjacent the tie down plate are thruster fuel tanks 522. It will be seen that the combination of the tie down plate 524, tension tie down assemblies 521, thrusters 523, and thruster fuel tanks 522 may be considered to comprise dispenser mechanism 520. To dispense the stack of satellites, the thrusters are used first to orient the stack (or a single satellite if deployment is to be one space craft at a time). Next, the pyrotechnic bolts are detonated at the corners of the tie down plate and the springs then eject the stack (or a single spacecraft) away from the tie down plate. It will be seen that a tie down plate and appropriate spring loaded bolts may be attached to the base member of either the first of a group of satellites to be deployed simultaneously or, in the case of one-by-one dispensation, such apparatus would be placed between every satellite in the nested stack.

The nested stack of spacecraft may be used to full space-saving advantage by placing dispenser mechanism 520 at the opposite end of stack 510 in the internal cavity of the lower satellite. This configuration is shown, for example, in the spacecraft stack of FIG. 2A. Additionally, the stack as configured in FIG. 2A effectively occupies more of the cone-shaped nose area of the typical launch vehicle stowage compartment.

Hence, spacecraft designed in accordance with the principles of this invention are more easily adapted to relatively improved, compact nested stacks of multiple satellites where required for multiple satellite system missions.

The invention has been explained with reference to a detailed description of a preferred embodiment with some exemplary alternatives. It is to be understood that such descriptions have been given for the sake of example only and are not intended to limit the scope and spirit of the invention defined by the appended claims. It should be noted that, while the preferred approach is to provide planar side walls coupled to a polygonal base member, the invention contemplates any number of spacecraft shapes, so long as an interior cavity is provided and adapted for receipt of at least a portion of the body of another similarly configured spacecraft. For example, spacecraft envisioned by the invention could include substantially spherical cup-shapes, or pyramid-type structures with side walls terminating substantially at a common point, with no base member required.

What is claimed is:

1. A spacecraft body comprising:
    a base member having a perimeter; and
    a plurality of side wall members, each coupled at a boundary thereof to a portion of the perimeter of the base member and each extending at an angle greater than zero to a plane containing the base member perimeter, thereby resulting in a substantially cup-shaped spacecraft structure and a hollow inner cavity opening outwardly at boundaries of the side walls remote from the side wall boundaries coupled to the base member, each side wall member providing a surface to which is attached an array of photovoltaic devices and an antenna.

2. The spacecraft body of claim 1 wherein the base member comprises a body of substantially planar polygonal cross section and wherein each side wall member is coupled to the base member along a different lateral side surface of the polygonal body.

3. The spacecraft body of claim 1 wherein each side wall member is substantially planar.

4. The spacecraft body of claim 2 wherein each side wall member is substantially planar.

5. The spacecraft body of claim 1 wherein the base member houses an electronics and power supply payload.

6. The spacecraft body of claim 1 wherein the base member and side wall members are substantially planar, the base member housing an electronics and power supply payload and each side wall member providing a surface means for mounting flush therewith a deployable planar antenna panel and a fixed planar array of photovoltaic devices.

7. The spacecraft body of claim 1 wherein the base member and side wall members are substantially planar, the base member housing an electronics and power supply payload and each side wall member providing a surface means for mounting flush therewith a deployable planar array of photovoltaic devices and a fixed planar antenna panel.

8. A spacecraft body as set forth in claim 1 wherein the hollow inner cavity in shaped such that at least a portion of the exterior surfaces of a similarly designed spacecraft body may be placed in nested fashion in the hollow interior.

9. In a vehicle for launching a plurality of spacecraft, the vehicle including a stowage compartment for stowing one or more spacecraft to be deployed at a time subsequent to initial launch of the vehicle, an improved arrangement for stowing the plurality of spacecraft comprising:
    a stack of nested spacecraft in the stowage compartment wherein each spacecraft has a substantially cup-like configuration substantially enclosing a hollow cavity opening at one portion of the spacecraft, with the hollow cavity of a first spacecraft receiving in nested fashion at least a substantial portion of a second spacecraft underlying the first spacecraft in the stack.

10. The improved arrangement of claim 9 wherein each spacecraft comprises a base member and side walls substantially enclosing the hollow cavity opening at the perimeter of the side walls remote from the base member.

11. The improved arrangement of claim 10 wherein the base member of each spacecraft in the nested stack has a substantially planar polygonal cross section and wherein each side wall is coupled to the base member along a different lateral side surface of the polygonal base member.

12. The improved arrangement of claim 10 wherein each side wall of each spacecraft in the stack is substantially planar.

13. The improved arrangement of claim 10 wherein the base member of a preselected spacecraft in the stack is coupled to means for dispensing the preselected spacecraft along with all spacecraft in the stack, if any, nested to the preselected spacecraft.

14. The improved arrangement of claim 13 wherein the means for dispensing includes means for coupling under tension the base member of the preselected spacecraft to the means for dispensing, means for positioning the preselected spacecraft and any other spacecraft nested thereto in a predetermined position attitude and means for separating the preselected spacecraft and any other spacecraft nested thereto from the means for dispensing.

15. The improved arrangement of claim 14 wherein the means for positioning comprises fueled rocket thrusters coupled to the means for coupling under tension so as to effect preselected orientation thereof.

16. In a vehicle for launching a plurality of spacecraft, the vehicle including a stowage compartment for stowing one or more spacecraft to be deployed at a time subsequent to initial launch of the vehicle, an improved arrangement for stowing the plurality of spacecraft comprising:
    a stack of nested spacecraft in the stowage compartment wherein each spacecraft has a body of substantially cup-like configuration with a structure comprising a body base member and side walls substantially enclosing a hollow cavity opening at the perimeter of the sidewalls remote from the base member, and wherein the base member of each spacecraft in the stack houses an electronics and power supply payload and wherein each side wall of the spacecraft in the stack houses an array of photovoltaic devices and an antenna.

17. The improved arrangement of claim 16 wherein the base member and side walls of each spacecraft body in the stack are substantially planar.

* * * * *